US009219750B2

(12) United States Patent
Murakami et al.

(10) Patent No.: US 9,219,750 B2
(45) Date of Patent: Dec. 22, 2015

(54) COMMUNICATION ACCESS CONTROL DEVICE, COMMUNICATION ACCESS CONTROL METHOD, AND COMPUTER READABLE RECORDING MEDIUM

(75) Inventors: Takuya Murakami, Tokyo (JP); Naoshi Higuchi, Tokyo (JP)

(73) Assignee: NEC CORPORATION, Tokyo (JP)

(*) Notice: Subject to any disclaimer, the term of this patent is extended or adjusted under 35 U.S.C. 154(b) by 49 days.

(21) Appl. No.: 13/879,851

(22) PCT Filed: Jun. 28, 2011

(86) PCT No.: PCT/JP2011/003689
§ 371 (c)(1),
(2), (4) Date: Apr. 17, 2013

(87) PCT Pub. No.: WO2012/053135
PCT Pub. Date: Apr. 26, 2012

(65) Prior Publication Data
US 2013/0239172 A1    Sep. 12, 2013

(30) Foreign Application Priority Data
Oct. 20, 2010   (JP) .................................. 2010-235283

(51) Int. Cl.
G06F 17/00 (2006.01)
H04L 29/06 (2006.01)
G06F 21/42 (2013.01)

(52) U.S. Cl.
CPC .............. H04L 63/20 (2013.01); G06F 21/42 (2013.01); H04L 63/102 (2013.01); H04L 65/104 (2013.01); H04L 65/1069 (2013.01); H04L 63/0272 (2013.01)

(58) Field of Classification Search
CPC ..... H04L 63/20; H04L 63/10; H04L 63/0272; G06F 21/42

USPC .......................................................... 726/1, 4
See application file for complete search history.

(56) References Cited

U.S. PATENT DOCUMENTS

2004/0125781 A1* 7/2004 Walter et al. .................. 370/338
2007/0162749 A1* 7/2007 Lim .............................. 713/167

(Continued)

FOREIGN PATENT DOCUMENTS

EP        1802071 B1 *  7/2008
JP        3688282 B2    6/2005

(Continued)

OTHER PUBLICATIONS

International Search Report of PCT Application No. PCT/JP2011/003689 mailed on Sep. 27, 2011.

*Primary Examiner* — Shewaye Gelagay
*Assistant Examiner* — Amie C Lin

(57) ABSTRACT

A communication control apparatus that controls communication via a network between a first communication apparatus for communicating via a virtual communication channel and a second communication apparatus for transmitting a communication request with the first communication apparatus including a storage unit that stores access control policy defining allowance or denial of access to the first communication apparatus, an establishment unit that establishes the virtual communication channel with the first communication apparatus, an authentication unit that authenticates the second communication apparatus based on the communication request received from the second communication apparatus, an access control unit that refers to the access control policy and evaluates whether to allow or deny access from the authenticated second communication apparatus to the first communication apparatus, and a transfer unit that transfers the received communication request to the first communication apparatus when the access control unit evaluates that the access is allowed.

16 Claims, 8 Drawing Sheets

(56) References Cited

U.S. PATENT DOCUMENTS

| | | | |
|---|---|---|---|
| 2008/0098461 A1* | 4/2008 | Chiou et al. | 726/4 |
| 2009/0327501 A1* | 12/2009 | Athsani et al. | 709/229 |
| 2009/0327507 A1* | 12/2009 | Douillet et al. | 709/230 |
| 2010/0024009 A1* | 1/2010 | Comay et al. | 726/4 |

FOREIGN PATENT DOCUMENTS

| | | |
|---|---|---|
| JP | 2006-85670 A | 3/2006 |
| JP | 2007-220088 A | 8/2007 |
| WO | 2004/092905 A2 | 10/2004 |

\* cited by examiner

| ACCESS SOURCE | ACCESS DESTINATION | METHOD | URL | PROCESS |
|---|---|---|---|---|
| Bob | Alice | GET | /addressbook/* | Deny |
| Bob | Alice | GET | * | Allow |
| Bob | Alice | POST | /calendar/* | Allow |
| Alice | Bob | GET | * | Allow |

Fig. 5

COMMUNICATION ACCESS CONTROL DEVICE, COMMUNICATION ACCESS CONTROL METHOD, AND COMPUTER READABLE RECORDING MEDIUM

This application is a National Stage Entry of PCT/JP2011/003689 filed Jun. 28, 2011, which claims priority from Japanese Patent Application 2010-235283 filed Oct. 20, 2010, the contents of all of which are incorporated herein by reference, in their entirety.

TECHNICAL FIELD

The present invention relates to a communication control apparatus, a system, a method, and a non-transitory computer readable medium storing a problem thereon, and particularly to a communication control apparatus, a system, a method, and a non-transitory computer readable medium storing a program thereon for controlling communication via a network between a device offering a service and a client requesting the service.

BACKGROUND ART

In recent years, development of the Internet is helping spread cloud computing that disposes a number of servers over data centers on the Internet and provides users with services. In cloud computing, various services and data are disposed on the servers. A user device, which is a device possessed by a user, is used to access the server to enjoy the services. In this case, the user device is a client, and specifically, a personal computer, a mobile terminal, a household appliance and the like. The user device plays a role merely as a viewer for using the data and services on cloud.

Meanwhile, there are cases in recent years in which the device possessed by the user itself plays a role of providing the services. For example, a network video recorder may include a Web server function. In this case, access via HTTP (Hyper Text Transfer Protocol) enables the user to schedule a recording remotely or enjoy playing a recorded program. Alternatively, there could be increasing usage in the future in which the sensor device around the user has a server function and accessed by the cloud side.

When the user device is used as a service provider side, the user device needs to be accessed from the Internet side. However, there are some issues in this regard. First, the user device is not necessarily connected to the Internet directly. Take a home network for example, in most cases, these devices are connected under a NAT (Network Address Translator) router and often cannot be connected directly via the Internet.

Second, even when the user device can be connected via the Internet, an IP address of the user device is often not fixed, thereby making it difficult for a connection source to identify the device to be connected.

Patent literature 1 discloses a method as one method to solve this. In patent literature 1, a server is disposed on the Internet to be a relay apparatus, and a user device establishes a tunnel such as VPN with the server. The connection source will not be connected directly to the user device but is connected to this server and accesses the user device via the tunnel from the server.

According to the method disclosed in patent literature 1, the user device can be connected from the Internet side, and the services offered by the user device can be used. Moreover, in the method according to patent literature 1, the device is authenticated when the user device is connected to a gateway. Patent literature 1 further presents a method for authenticating an accessing side to this user device remotely and denying access from an unauthorized user.

CITATION LIST

Patent Literature

Patent literature 1: Japanese Patent No. 3688282

SUMMARY OF INVENTION

Technical Problem

The method disclosed in patent literature 1 only assumes the case that an owner of the user device and an access source are the same person or in a close relationship. However, in practice, the access source can be a completely different person, for example, an acquaintance residing in a remote place, a superior or an administrator at work, an operator in a call center, or a service program on cloud.

In this case, it is necessary to correctly evaluate which access source user is allowed to access which user device. It is also necessary to flexibly create and abandon the rule therefor. Further, there may be necessity generated for the user device to be accessed to change the offering services depending on the access source. The method disclosed in patent literature 1 is unable to deal with such a case. Therefore, the method disclosed in patent literature 1 has a problem that when the owner of the user device and the access source user are different, access is not allowed to the user device in order to ensure safety.

The present invention is made to solve such a problem, and an objective of the present invention is to provide a communication control apparatus, a system, a method, and a non-transitory computer readable medium storing a program thereon for enabling safe access to a service offered by a device via a network.

Solution to Problem

A first exemplary aspect of the present invention is a communication control apparatus that controls communication via a network between a first communication apparatus for communicating via a virtual communication channel and a second communication apparatus for transmitting a communication request with the first communication apparatus. The communication control apparatus includes a storage unit that stores access control policy, the access control policy defining allowance or denial of access to the first communication apparatus, an establishment unit that establishes the virtual communication channel with the first communication apparatus via the network in response to a request from the first communication apparatus, an authentication unit that authenticates the second communication apparatus based on the communication request received from the second communication apparatus via the network, an access control unit that refers to the access control policy stored to the storage unit and evaluates whether to allow or deny access from the authenticated second communication apparatus to the first communication apparatus, and a transfer unit transfers the received communication request to the first communication apparatus when the access control unit evaluates that the access is allowed.

A second exemplary aspect of the present invention is a communication control system including a first communication apparatus, a second communication apparatus, and a communication control apparatus, the first communication apparatus communicating via a virtual communication channel, the second communication apparatus transmitting a communication request to the first communication apparatus, and the communication control apparatus controlling communication via a network between the first communication apparatus and the second communication apparatus. The communication control apparatus includes storage means for storing access control policy, the access control policy defining allowance or denial of access to the first communication apparatus, establishment means for establishing the virtual communication channel with the first communication apparatus via the network in response to the request from the first communication apparatus, authentication means for authenticating the second communication apparatus based on the communication request received from the second communication apparatus via the network, access control means for referring to the access control policy stored to the storage means and evaluating whether to allow or deny access from the authenticated second communication apparatus to the first communication apparatus, and transfer means for transferring the received communication request to the first communication apparatus when the access control means evaluates that the access is allowed.

A third exemplary aspect of the present invention is a communication control method for controlling communication between a first communication apparatus and a second communication apparatus via a network. The communication control method includes, in response to a request from the first communication apparatus for communicating via a virtual communication channel, establishing the virtual communication channel with the first communication apparatus via the network, authenticating the second communication apparatus based on the communication request with the first communication apparatus received from the second communication apparatus via the network, referring to access control policy and evaluating whether to allow or deny access from the authenticated second communication apparatus to the first communication apparatus, in which the access control policy defines whether to allow or deny access to the first communication apparatus, and transferring the received communication request to the first communication apparatus when the access is evaluated as being allowed.

A fourth exemplary aspect of the present invention is a non-transitory computer readable medium storing a communication control program thereon, in which the communication control program causes a computer to execute a process including an establishment process that, in response to a request from a first communication apparatus for communicating via a virtual communication channel, establishes the virtual communication channel with the first communication apparatus via the network, an authentication process that authenticates the second communication apparatus based on the communication request received from the second communication apparatus via the network, an access control process that refers to access control policy and evaluates whether to allow or deny access from the authenticated second communication apparatus to the first communication apparatus, in which the access control policy is stored to a storage unit and defines whether to allow or deny access to the first communication apparatus, and a transfer process that transfers the received communication request to the first communication apparatus when the access control process evaluates that the access is allowed.

Advantageous Effects of Invention

According to the present invention, it is possible to provide a communication control apparatus, a system, a method, and a non-transitory computer readable medium storing a program thereon for enabling safe access to a service offered by a device via a network.

BRIEF DESCRIPTION OF DRAWINGS

FIG. 5 is a diagram showing an example of an access control list according to the second exemplary embodiment of the present invention;

DESCRIPTION OF EMBODIMENTS

Figure 1:
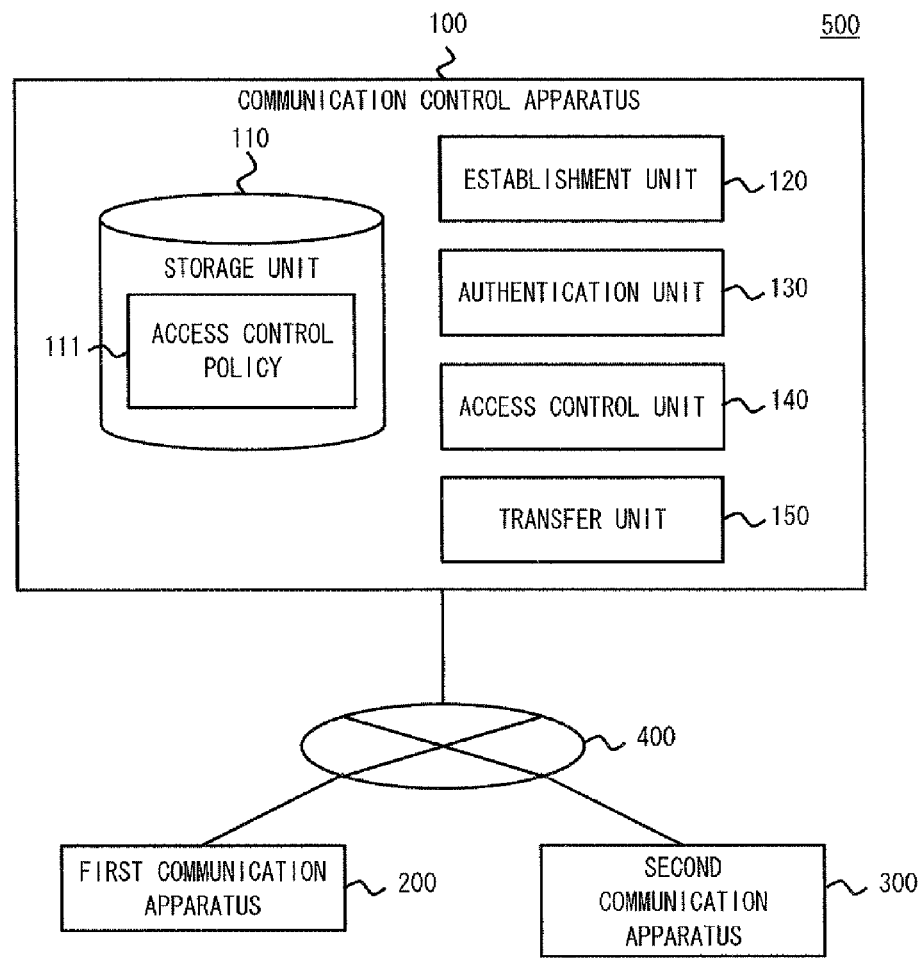
FIG. 1 is a block diagram showing a configuration of a communication control system according to a first exemplary embodiment of the present invention.

Hereinafter, specific exemplary embodiments incorporating the present invention are explained in detail with reference to the drawings. In each drawing, the same components are denoted by the same reference numerals, and duplicated explanation is omitted as necessary for clarity of explanation.

First Exemplary Embodiment of the Invention

FIG. 1 is a block diagram showing a configuration of a communication control system 500 according to a first exemplary embodiment of the present invention. The communication control system 500 includes a communication control apparatus 100, a first communication apparatus 200, a second communication apparatus 300, and a network 400. The communication control apparatus 100, the first communication apparatus 200, and the second communication apparatus 300 are connected via the network 400.

The first communication apparatus 200 communicates via a virtual communication channel. The second communication apparatus 300 transmits a communication request with the first communication apparatus 200. The communication control apparatus 100 controls communication between the first communication apparatus 200 and the second communication apparatus 300 via the network 400.

The communication control apparatus 100 includes a storage unit 110, an establishment unit 120, an authentication unit 130, an access control unit 140, and a transfer unit 150. The storage unit 110 is a storage apparatus that stores access control policy 111 for defining whether access to the first communication apparatus 200 is allowed or denied.

In response to a request from the first communication apparatus 200, the establishment unit 120 establishes a virtual communication channel with the first communication apparatus 200 via the network 400. The authentication unit 130 authenticates the second communication apparatus 300 based on the communication request received from the second communication device 300 via the network 400. The access control unit 140 refers to the access control policy 111 stored to the storage unit 110, and evaluates whether or not the authenticated second communication apparatus 300 is allowed to access the first communication apparatus 200. When the access control unit 140 evaluates that the access is allowed, the transfer unit 150 transfers the received communication request to the first communication apparatus 200.

The network 400 is a communication network such as the Internet, an intranet, a public network, a dedicated line, and a mobile communication network.

Figure 2:
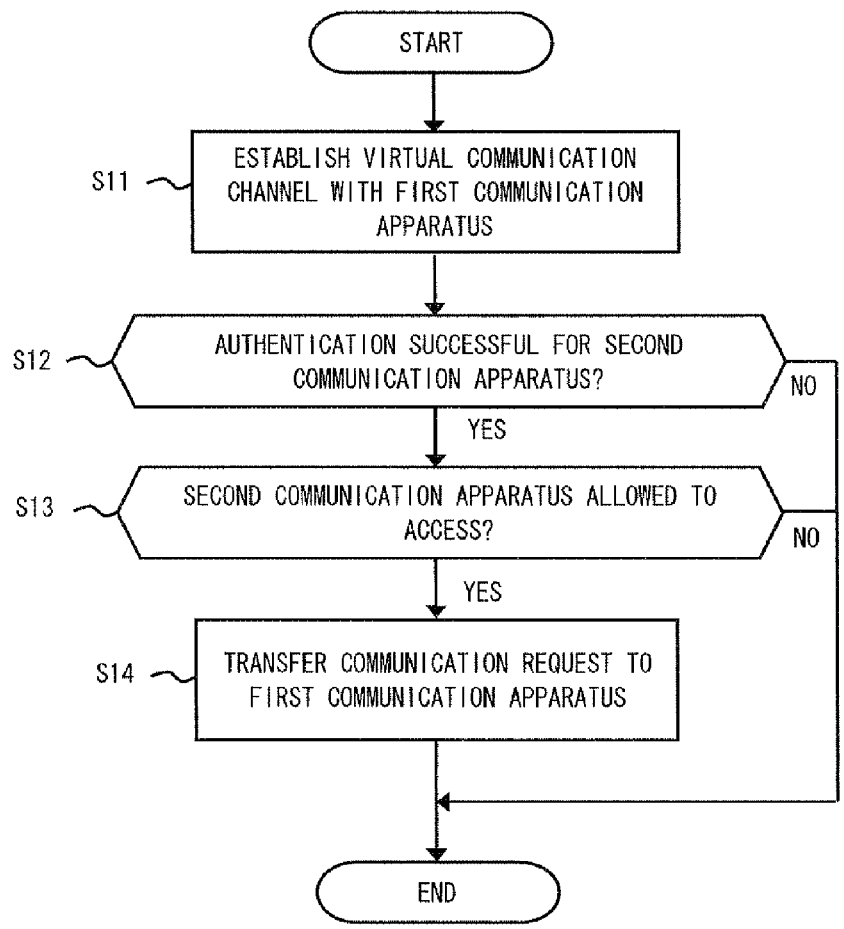
FIG. 2 is a flowchart showing a flow of a process in a communication control method according to the first exemplary embodiment of the present invention.

FIG. 2 is a flowchart showing a flow of a process in a communication control method according to the first exemplary embodiment of the present invention. First, the establishment unit 120 receives a request for establishing a virtual communication channel from the first communication apparatus 200. Then, in response to the request from the first communication apparatus 200, the establishment unit 120 establishes the virtual communication channel with the first communication apparatus 200 via the network 400 (S11).

Next, the authentication unit 130 receives a communication request with the first communication apparatus 200 from the second communication apparatus 300 via the network 400. Subsequently, the authentication unit 130 authenticates the second communication apparatus 300 based on the received communication request. After that, the access control unit 140 evaluates whether or not the authentication is successful (S12).

When the access control unit 140 evaluates that the authentication is successful, the access control unit 140 refers to the access control policy 111 stored to the storage unit 110, and evaluates whether or not the authenticated second communication apparatus 300 is allowed to access the first communication apparatus 200 (S13). When the access control unit 140 evaluates that the access is allowed, the transfer unit 150 transfers the received communication request to the first communication apparatus 200 (S14). The first communication apparatus 200 and the second communication apparatus 300 communicate in a similar manner based on control by the communication control apparatus 100 on and after the step S14.

Note that when the authentication is evaluated as failed in the step S12 or evaluated that the access is denied in the step S13, the communication control apparatus 100 ends the communication control process.

Then, the second communication apparatus 300, which is a request source for the first communication apparatus 200, can be ensured as being authenticated by the communication control apparatus 100 and also an already defined apparatus. Moreover, as the communication between the first communication apparatus 200 and the communication control apparatus 100 is carried out by the virtual communication channel, safety can be ensured. Therefore, this provides safe access to the services offered by the device via the network.

Second Exemplary Embodiment of the Invention

Figure 3:
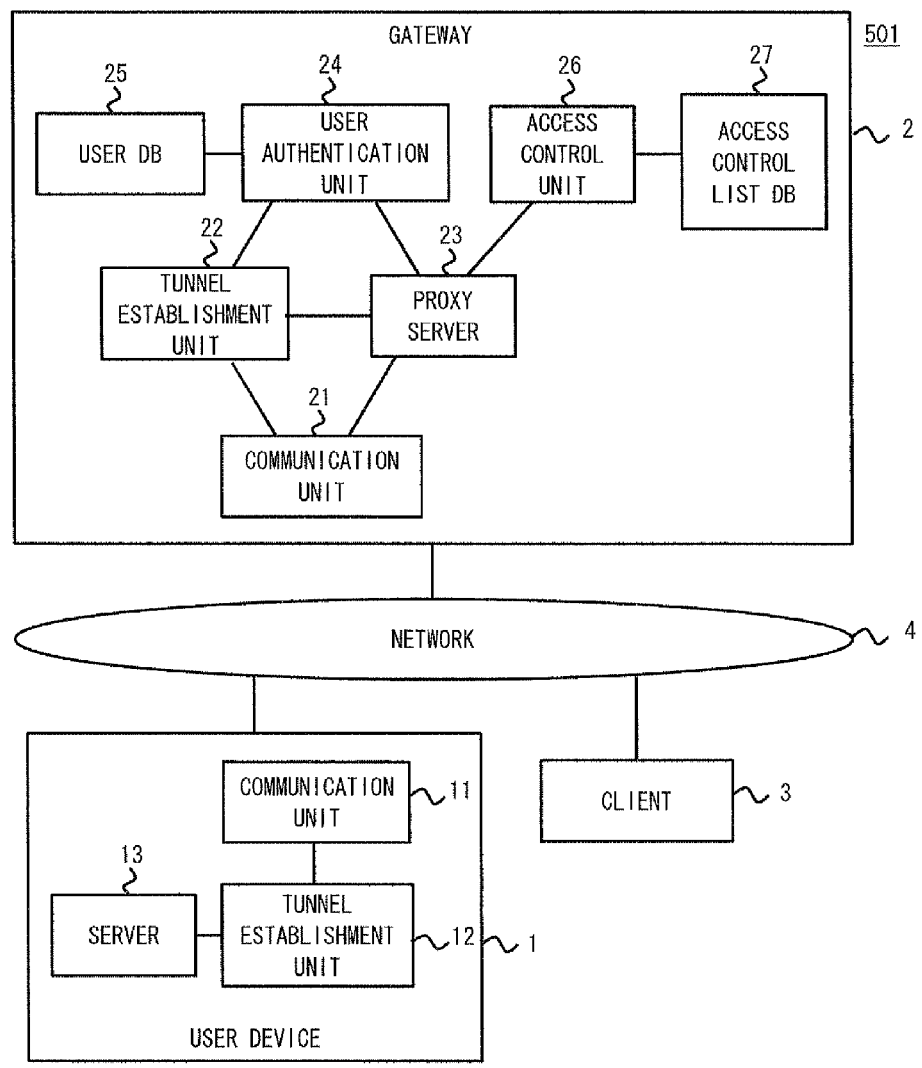
FIG. 3 is a block diagram showing a configuration of a communication control system according to a second exemplary embodiment of the present invention.

FIG. 3 is a block diagram showing a configuration of a communication control system 501 according to a second exemplary embodiment of the present invention. In the communication control system 501, a user device 1, a gateway 2, and a client 3 are connected via the network 4. The user device 1 is one example of the first communication apparatus 200, the client 3 is one example of the second communication apparatus 300, and the gateway 2 is one example of the communication control apparatus 100. The user device 1 offers predetermined services via a virtual communication channel, and the client 3 transmits a service request as a communication request for receiving the predetermined services.

The network 4 is, typically, the Internet. However, the network 4 may be a closed network like an intranet. Moreover, the network 4 does not need to be a single network. For example, the network 4 may be a home LAN, a corporate intranet, or a closed network between telecommunication operators, to which the user device 1 is connected. In this case, the apparatuses may be connected via a NAT router, a firewall, or a proxy apparatus.

The user device 1 includes a communication unit 11, a tunnel establishment unit 12, and a server 13. The communication unit 11 is means for communicating with the gateway 2 via the network 4.

The tunnel establishment unit 12 is means for establishing a tunnel with the gateway 2. The tunnel establishment unit 12 is, typically, a VPN (Virtual Private Network) client. The tunnel here may be a tunnel that is established by encapsulating an IP (Internet Protocol) packet as in tunnel mode IPsec (Security Architecture for Internet Protocol). Alternatively, the tunnel may be a tunnel that passes a payload of the TCP (Transmission Control Protocol) like the port forward. The tunnel is desirably encrypted but not limited thereto.

The tunnel establishment unit 12 operates as a client for tunnel connection. The tunnel establishment unit 12 makes a tunnel connection request to the gateway 2 and establishes a tunnel.

The server 13 is a server for providing services to the client 3. The server 13 is, typically, a Web server, an FTP (File Transfer Protocol) server, a file server, a DLNA (Digital Living Network Alliance) server, or a media server.

Note that in this exemplary embodiment, the server 13 is included in the user device 1. However, the server 13 is not necessarily included in the device 1 but may be included in another device. In this case, the tunnel establishment unit 12 and the server 13 communicate via the network.

Note that the communication unit 11 may be configured to allow only the communication with the gateway 2 and deny other communication. Although the simplest method is to provide the communication unit 11 with a packet filtering function and the communication unit 11 is configured with a filter rule that passes connection requests such as TCP to outside and denies all connection requests from outside. This is because that when the tunnel is established from the communication unit 11 to the gateway 2 at any time, the tunnel can pass the packet filter.

The gateway 2 is a communication control apparatus including a communication unit 21, a tunnel establishment unit 22, a proxy server 23, a user authentication unit 24, a user DB (DataBase) 25, an access control unit 26, and an access control list DB 27. Although the gateway 2 is generally disposed on a wide area network such as the Internet, it is not limited to this. For example, the gateway 2 may be disposed on a closed network such as a home LAN or a mobile operator network. Further, the gateway 2 may disposed at a connection point between multiple networks.

The communication unit 21 is means to communicate with the user device 1 or the client 3 via the network 4. The tunnel establishment unit 22 operates as a tunnel server. Then, the tunnel establishment unit 22 receives a tunnel establishment request from the user device 1, and establishes a tunnel with the user device 1. Moreover, upon establishment of the tunnel, the tunnel establishment unit 22 performs authentication using the user authentication unit 24 and the user DB 25. When the authentication fails, the tunnel is disconnected.

The user DB 25 is a database of user information for managing users accessing the gateway 2 itself. The user information includes, for example, a user ID, a password and the like. The user authentication unit 24 refers to the user DB 25 and evaluates whether or not to allow access to the gateway 2 itself.

The proxy server 23 is means to receive the communication request from the client 3 by proxy, and transfer the communication request to the user device 1. The proxy server 23 is a HTTP reverse proxy, for example. Specifically, the proxy server 23 receives an HTTP request from the client 3, interprets the request, identifies the user device 1, which is a transfer destination, and transfers the HTTP request. There are various methods for an identification method of the user device 1. For example, there is a method of embedding a device identifier ("device@12345" in this case) in a URL (Uniform Resource Locator) as in "http-//device@12345.example.com". Note that this communication may be HTTPS or protocols other than HTTP instead of HTTP.

Note that when a URL is assigned to the user device as above, a DNS (Domain Name System) is configured so that communication with this URL reaches the proxy server 23. In the case of the abovementioned example, the DNS is configured so that A record corresponding to "*.example.com" will be an IP address of the gateway 2.

Moreover, upon receipt of the communication request, the proxy server 23 performs user authentication using the user authentication unit 24 and the user DB 25. Although various methods can be considered for authentication protocols, generally Basic authentication or Digest authentication for HTTP is used in the case of HTTP.

The proxy server 23 calls the access control unit 26 for checking whether or not to allow transfer before transferring the communication to the user device 1. At this time, the proxy server 23 hands over both identifiers used for authentication of the user device 1 and the client 3 to the access control unit 26. The proxy server 23 transfers the communication only when the access control unit 26 allows the access, and in other cases than when the access is allowed, the proxy server 23 denies the communication request from the client 3.

The access control unit 26 refers to the access control list DB 27 and evaluates whether or not to allow the transfer the communication. FIG. 5 is a diagram showing an example of data stored to the access control list DB 27 according to the second exemplary embodiment of the present invention. The access control list DB 27 describes, a user of which client 3 is allowed to access which user device 1 for what kind of access. The entries in the list are sorted in order of priority.

Assume that an authenticator of the client 3 is "Bob" and an authenticator of the user device 1 is "Alice" here. For example, the first line indicates that a GET method of HTTP is denied for a URL path "/addressbook/*". This means that when a URL of the user device 1 is "http-//alice.example.com", access to "http-//alice.example.com/addressbook/index.html", for example, is denied.

On the other hand, the second line indicates that access is allowed for URLs other than the above URL. Further, the third line indicates that writing by a POST method is allowed to "/calendar."

On the contrary, the fourth line indicates that from "Alice" to "Bob", all GET access is allowed. Everything not included in this list is denied. For example, "Chalie", which is not included as the access source in the list, is not allowed to access "Alice" at all.

Note that although not shown in FIG. 5, an expire date, the number of use, and the maximum number of use may be added to each entry. In that case, expired entries are treated as invalid. Alternatively, when the maximum number of use is set to the entry, the number of use is incremented every time communication matching the entry is transferred, and entries with the number of use exceeding the maximum number of use are treated as invalid. Then, invalid entries may be automatically deleted. This realizes entries that are valid for a certain period of time or certain number of times.

Note that in the second exemplary embodiment of the present invention, although the gateway 2 is represented as one apparatus, the gateway 2 may be a system including functions each operating on different apparatuses. Further, the gateway 2 may have functions each operating on multiple apparatuses. A typical example that can be assumed is to use a load balancer to attempt load balancing. In this case, the functions of the gateway 2 can operate on different apparatuses by connecting the load balancer to the network 4, and connecting the proxy server 23, the tunnel establishment unit 22, the user DB 25, and the access control list DB 27 to the load balancer.

The gateway 2 is not necessarily a physical communication device but may be a program operating on a server device that is disposed on cloud, for example. Moreover, the server device may also be a virtual machine operating on a physical server.

Figure 4:
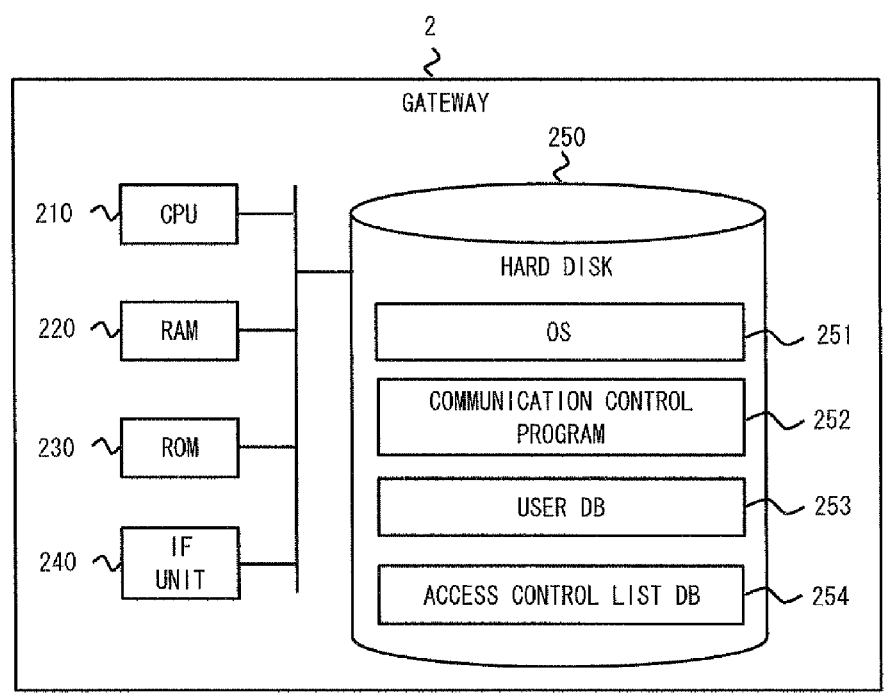
FIG. 4 is a block diagram showing a hardware configuration of a gateway according to the second exemplary embodiment of the present invention.

FIG. 4 is a block diagram showing a hardware configuration of the gateway 2 according to the second exemplary embodiment of the present invention. The gateway 2 includes a CPU (Central Processing Unit) 210, a RAM (Random Access Memory) 220, a ROM (Read Only Memory) 230, an IF unit 240, and a hard disk 250.

The hard disk 250 is a non-volatile storage apparatus. The hard disk 250 stores an OS 251, a communication control program 252, a user DB 253 and an access control list DB 254. The communication control program 252 here is a computer program to which the communication control process according to the second exemplary embodiment of the present invention is implemented. The user DB 253 represents a region which is reserved on the hard disk 250 for the user DB 25 of FIG. 3, and the access control list DB 254 represents a region which is reserved on the hard disk 250 for the access control list DB 27 of FIG. 3.

The CPU 210 controls various processes in the gateway 2 and access and the like to the RAM 220, the ROM 230, the IF unit 240, and the hard disk 250. The IF unit 240 communicates with outside including the user device 1 and the client 3 via the network 4.

In the gateway 2, the CPU 210 reads the OS 251, the communication control program 252 and the like that are stored to the RAM 220, the ROM 230, or the hard disk 250, and executes them. Then, the gateway 2 can function as a communication control apparatus and control communication between the user device 1 and the client 3.

The client 3 is an apparatus that accesses the user device 1 via the network 4. The client 3 is, for example, a common personal computer or a mobile phone. The client 3 includes a Web browser, accesses the gateway 2 by HTTP or HTTPS, and uses the services offered by the user device 1. In addition, the client 3 may communicate with the gateway 2 by a protocol other than HTTP using dedicated client software instead of the Web browser.

Alternatively, the client 3 may be a server instead of a terminal. For example, the client 3 may be a service server that offers services on the Internet to users. In this case, the client 3 shall include an HTTP client function, makes a communication request to the user device 1, and performs information gathering and control. As an example, the user device 1 may be a video recorder, and the client 3 is a television program listing service on the Internet. In this case, the television program listing service might make a request to the video recorder for recording a program, for example.

Figure 6:
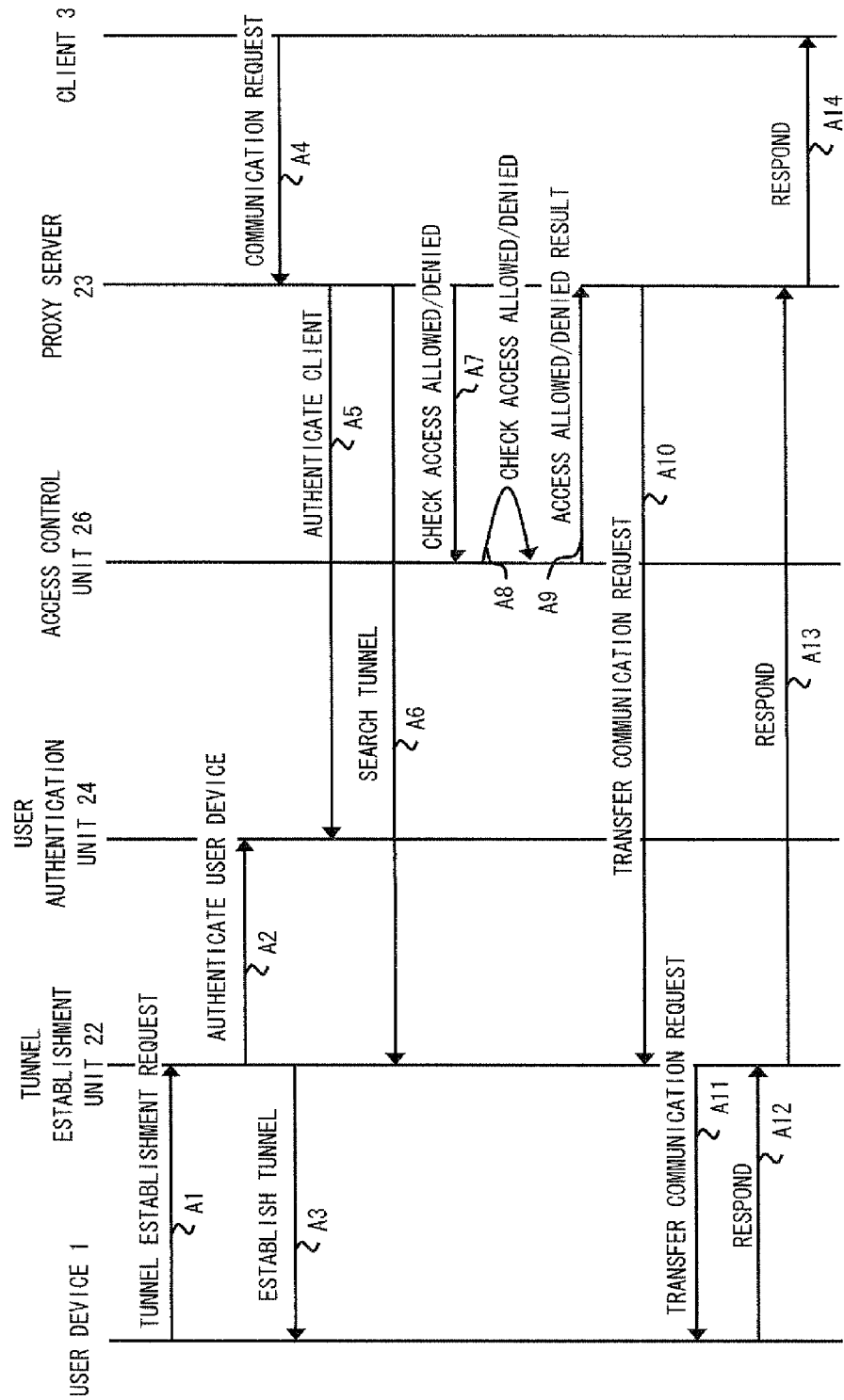
FIG. 6 is a sequence diagram showing a flow of a process in a communication control method according to the second exemplary embodiment of the present invention.

FIG. 6 is a sequence diagram showing a flow of a process in the communication control method according to the second exemplary embodiment of the present invention. First, the user device 1 transmits a tunnel establishment request to the gateway 2 (step A1). At this time, the communication unit 21 of the gateway 2 receives the tunnel establishment request from the communication unit 11 of the user device 1, and hands over the tunnel establishment request to the tunnel establishment unit 22.

Next, the tunnel establishment unit 22 authenticates the user device 1 using the user authentication unit 24 in order to perform tunnel connection authentication (step A2). At this time, the user authentication unit 24 verifies authentication information transmitted from the user device 1, which is generally a user ID and a password, with the user information stored to the user DB 25, and performs authentication.

When authentication is successful in the step A2, the tunnel establishment unit 22 transmits to the user device 1 a response to the tunnel establishment request, and a tunnel is established (step A3).

Next, the client 3 transmits to the proxy server 23 the communication request with the user device 1 (step A4). For example, when a service URL of the user device 1 is "http-//alice.example.com/photo/", the client 3 obtains an IP address corresponding to a host name "alice.example.com" of the gateway 2 using the DNS, and transmits an HTTP request to the gateway 2. Note that as this operation is an operation of a common Web browser, detailed explanation is omitted.

The communication unit 21 receives the HTTP request and hands over the HTTP Request to the proxy server 23. The proxy server 23 authenticates the HTTP request first (step A5). Specifically, the proxy server 23 hands over to the user authentication unit 24 authentication information obtained in Basic authentication or Digest authentication of HTTP, and performs user authentication. When the authentication fails, the proxy server 23 transmits an error to the client 3.

Note that the same process is performed when the client 3 is a server instead of a terminal. In this case, an authentication method between Web services such as OAuth (RFC5849) other than HTTP authentication can be used as the authentication method.

When the authentication is successful in the step A5, the proxy server 23 identifies the user device 1 in cooperation with the tunnel establishment unit 22 (step A6). The HTTP request here includes information (e.g., a URL, a host name, and a path) for identifying the user device 1, which is an access destination, in a request URI (Uniform Resource IDentifier) or a Host header. Then, the proxy server 23 identifies the tunnel using this information included in the HTTP request. Moreover, the proxy server 23 obtains an identifier of the user device 1 connected to the tunnel at the same time as identifying the tunnel.

Next, the proxy server 23 instructs the access control unit 26 to check whether the access is allowed or denied in order to evaluate whether or not to transfer the communication (step A7).

The access control unit 26 verifies the identifier of the user device 1 transmitted from the proxy server 23, the identifier of the client 3, and an access destination URL with the access control list DB 27, and determines whether to allow or deny the access (step A8). Then, the access control unit 26 returns to the proxy server 23 a result whether the access is allowed or denied (step A9).

When the access is allowed, the proxy server 23 transfers the communication request (HTTP request) to the tunnel establishment unit 22 (step A10). At this time, the proxy server 23 may also embed in the HTTP request the identifier of the client 3 or information (e.g., a name, a telephone number, an address, an e-mail address) for identifying the user of the client 3. As an example, the identifier of the client 3 or the information for identifying the user of the client 3 may be embedded in a From header or a User-Agent header in the HTTP request. This enables the user device 1 to change the services depending the access source user.

The tunnel establishment unit 22 transmits to the user device 1 the communication request that is allowed for access by the access control unit 26 via the tunnel (step A11).

In the user device 1, the server 13 generates an HTTP Response to the communication request, and returns the HTTP Response to the gateway 2 via the tunnel establishment unit 12 and the communication unit 11 (step A 12).

The tunnel establishment unit 22 extracts the HTTP response received via the tunnel, and hands over the HTTP response to the proxy server 23 in response (step A13). The proxy server 23 returns the response to the client 3 (step A14).

Exemplary advantages of the second exemplary embodiment of the present invention are explained in view of above. A first exemplary advantage of the second exemplary embodiment of the present invention is that the user device can receive the communication request from the client safely via the Internet and responds to the communication request. The reason for this is that as the communication request is transferred using the tunnel established with the gateway apparatus, all communication not passing through the tunnel can be denied by the user device side.

Additionally, only the communication authenticated by the gateway side is transferred, thus there will be no access from an unknown client. Further, as the access control is performed using the access control list, the user device is capable of controlling in detail which client is allowed to access which resource.

Moreover, a secondary exemplary advantage is that there is no load at all generated on the user device side even upon unauthorized access. Since all access control processes are performed by the gateway side, all unauthorized access is denied by the gateway side, and no communication packet reaches the user device.

This is especially important in mobile devices such as a mobile phone. This is because that the mobile device is charged for communication packets generated and also has a limited amount of battery. When an attack like DoS (Denial of Service attack) can be made to such a user device, even when the attack is prevented by the user device side, the user device is charged for receiving packets and the battery is consumed. Such a problem does not occur in this method.

A second exemplary advantage of the second exemplary embodiment according to the present invention is that the user device can change the services to offer depending on the access source client. The reason for this is because it is possible to embed the identifier of the authenticated client in the data to be transferred from the gateway to the user device.

The feature of the second exemplary embodiment of the present invention can be restated as follows. When the access control unit evaluates that the access is allowed, the proxy server 23 adds identification information of the client 3 to the received communication request, and transfers the communication request to the user device 1. Then, the user device 1 responds based on the identification information added to the transferred communication request. The proxy server 23 receives from the user device 1 the response based on the identification information added to the transferred communication request, and transfers the response to the client 3 via the network 4. Moreover, the access control unit 26 evaluates whether the access is allowed using the information included in the communication request that is received from the client 3.

Third Exemplary Embodiment of the Invention

Figure 7:
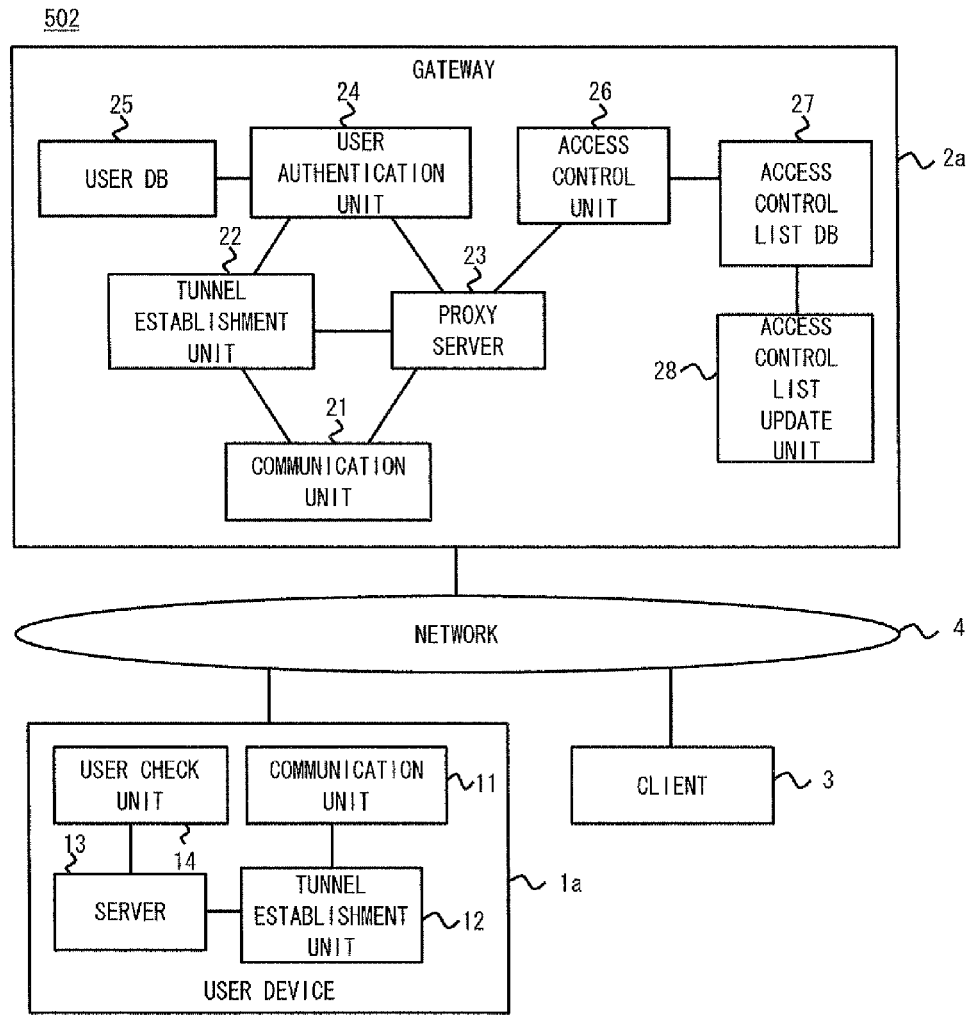
FIG. 7 is a block diagram showing a configuration of a communication control system according to a third exemplary embodiment of the present invention.

FIG. 7 is a block diagram showing a configuration of a communication control system 502 according to a third exemplary embodiment of the present invention. As compared with the abovementioned communication control system 501 according to the second exemplary embodiment of the invention shown in FIG. 3, the communication control system 502 further includes an access control list update unit 28 in a gateway 2a and a user check unit 14 in a user device 1a. In the following explanation, the same components as in FIG. 3 are denoted by the same reference numerals, and detailed explanation is omitted.

The user check unit 14 is means to check whether or not to allow access to the user upon an access request from the client 3. As an example, the user check unit 14 may be composed of a display and keys, for example, and may display the identifier of the client 3 or the user information of the client 3 on the display and accept key input for enabling selection of allowance or denial.

The access control list update unit 28 is means to add, delete, or update entries in the access control list DB 27. The access control list update unit 28 receives a user check result at the user check unit 14, and adds, deletes, or updates the entries in the access control list DB 27 as necessary.

Figure 8:
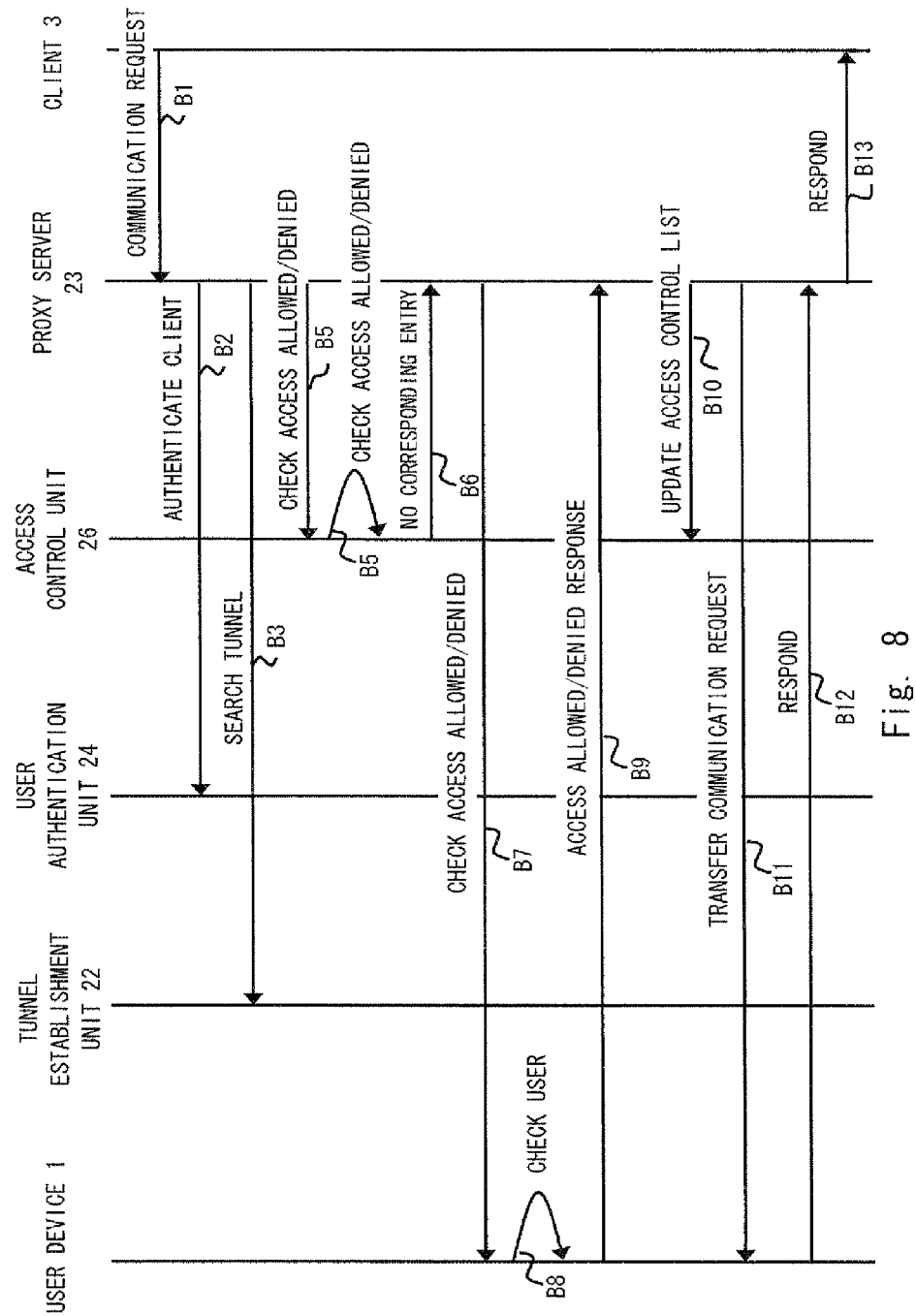
FIG. 8 is a sequence diagram showing a flow of a process in a communication control method according to the third exemplary embodiment of the present invention.

FIG. 8 is a sequence diagram showing a flow of a process in a communication control method according to the third exemplary embodiment of the present invention. First, the user device 1 establishes a tunnel with the gateway 2. Since this is the same as the steps A1 to A3 of FIG. 3, the explanation is omitted.

Next, the client 3 transmits a communication request (step B1). Subsequently, the proxy server 23 performs authentication (step B2), tunnel searching (step B3), and checks whether the access is allowed or denied (step B4). Since this step is the same as the steps A4 to A7 of FIG. 3, the explanation is omitted.

Next, the access control unit 26 searches in the access control list DB 27 (step B5). When the corresponding entry did not exist, the access control unit 26 replies to the proxy server 23 that the corresponding entry did not exist (step B6).

When the corresponding entry did not exist, the proxy server 23 queries the user device 1 whether or not to allow the access (step B7). One example of a communication request for query is an HTTP request. Specifically, the proxy server 23 generates an HTTP request and transmits the HTTP request to the tunnel establishment unit 22. Then, the tunnel establishment unit 22 transmits the HTTP request to the user device 1 via the tunnel. The proxy server 23 stores the identifier of the access source client 3 to the communication request for query. Alternatively, the proxy server 23 may store the information (e.g., a name, a telephone number, an address, and an e-mail address) for identifying the user of the client 3 to the communication request for query.

The user device 1 receives an access allowed/denied check request, and queries the user whether to allow or deny the access using the user check unit 14 (step B8). The user check unit 14 presents the user with the access source identifier or the user identification information included in the request on a display, for example, and enables the user to select whether to allow or deny. Allow/deny policy may be input by the user as described later. Note that at this time, the user may be requested for a password, PIN and the like in order to ensure security.

After the user check unit 14 completes checking the user, the user device 1 returns an access allowed/denied response to the gateway 2 via the tunnel (step B9). At this time, the user device 1 may include access allowed/denied information in a payload of the HTTP Response, for example.

Moreover, policy for indicating allowance or denial may be described in the access allowed/denied information. For example, it is possible to have indication of allowing access only for a certain number of times, for a certain period of time (e.g., one hour, one day, and one year), or for a fixed period of time (with specified date and time).

The proxy server 23 receives the access allowed/denied response from the user device 1, requests the access control unit 26 according to the result of the access allowed/denied response, and updates the access control list DB 27 (step B10). Specifically, the access control list update unit 28 updates the access control list DB 27 according to the access allowed/denied response. When the access allowed/denied response indicates that the access is allowed at this time, the access control list update unit 28 adds an allowed entry. Conversely, when the access allowed/denied response indicates that the access is denied, the access control list update unit 28 may add a denied entry to the access control list DB 27. Alternatively, when the access allowed/denied response indicates that the access is denied, the access control list update unit 28 may simply return an error to the client 3 without adding the entry to the access control list DB 27.

Moreover, when the access allowed/denied response includes policy of allowing only one access, the access control list update unit 28 may not update the access control list DB 27, and the proxy server 23 may only transfer the communication.

In any case, when the access is allowed, the proxy server 23 transmits the communication request to the user device 1 via the tunnel (step B11), and the user device 1 responds to this (step B12). Upon receipt of the response, the proxy server 23 transmits a response to the client 3 (step B13).

Note that in the step B12, the above allowed/denied policy may be embedded in the data responded by the user device 1. For example, in the step B5, when there is an entry of the access control list DB 27 and also is in an allowed state (in the case of step A9 in FIG. 6, for example), the proxy server 23 does not check with the user whether access is allowed or denied and directly transfers the communication request. In this case, by the user device 1 embedding the policy in the response data, the access control list update unit 28 can rewrite the entry already existing in the access control list DB 27.

Note that there can be various methods as to the place to embed the policy, one example for the HTTP response is that a field may be added to an HTTP header and the policy may be embedded therein.

Exemplary advantages of the third exemplary embodiment of the present invention are explained in view of above. A first exemplary advantage of the third exemplary embodiment according to the present invention is that the access control policy can be readily and dynamically changed in response to an instruction from the user device. The reason for this is that when there is access not in the policy, the gateway queries the user device whether the access is allowed or denied and is able to dynamically update the access control list according to a result of user check.

This exemplary advantage is especially effective when the user device and the client are different users. When the user device and the client are the same user, the access control list may be configured in advance, however in the case of allowing access to friends and acquaintances, there can be a number of entries. It is not easy for the user to previously specify such entries. With respect to this, in the third exemplary embodiment of the present invention, the user is checked at an initial connection by the client and an entry is easily added at that point, thus there is little burden imposed on the user.

The feature of the second exemplary embodiment of the present invention can be restated as follows. The gateway 2a further includes the access control list update unit 28 for updating the access control list DB 27. Then, the user device 1a transmits to the gateway 2a update contents of the access control policy in the client 3. At this time, the access control list update unit 28 updates the access control list DB 27 with the update contents received from the user device 1a.

Moreover, when the access control unit 26 evaluates that the access is denied, the proxy server 23 transmits to the user device 1a an evaluation request for whether the access is allowed or denied from the client 3. Then, the user device 1a transmits an evaluation result for the evaluation request to the gateway 2a. After that, the access control list update unit 28 updates the access control list DB 27 according to the received evaluation result, and the proxy server 23 responds to the client 3 according to the received evaluation result.

Further, the user device 1a outputs the evaluation request to outside, receives an evaluation result for the evaluation request from outside, and transmits the received evaluation result to the gateway 2a.

Furthermore, the user device 1a adds policy to be registered to the access control list DB 27, and responds to the communication request that is transferred from the gateway 2a. At this time, the access control list update unit 28 updates the access control list DB 27 with the policy added to the response from the user device 1a.

The access control list update unit 28 further updates the access control list DB 27 with the policy to be registered to the access control list DB 27 that is added to the response from the user device 1a.

Additionally, when the received evaluation result includes access allowance to a communication request other than the communication request received from the client 3, the access control list update unit 28 updates the access control list DB 27. That is, when the received evaluation result indicates that the access is allowed only to the communication request received from the client 3 this time, the access control list update unit 28 will not update the access control list DB 27.

<Fourth Exemplary Embodiment of the Invention>

Next, a fourth exemplary embodiment of the present invention is explained. In the above third exemplary embodiment of the present invention, the client allowed by the user on the user check unit 14 is allowed to access the user device 1. At this time, it can be readily assumed that the user easily allows the access without sufficiently checking the identifier of the client. Therefore, there is risk in terms of security. Accordingly, in the fourth exemplary embodiment of the present invention, in order to further improve the security, the gateway 2a checks that both the user device 1a and the client 3 have secret information that is unknown to the others.

As an example, when the user device 1a and the client 3 can be connected by near field communication such as wireless LAN, Bluetooth (registered trademark), IrDA, FeliCa (registered trademark), or visible light, the user device 1a and the client 3 can exchange the secret information without using the network 4. Alternatively, image information including a barcode, for example, can be displayed on the user device 1a for the client 3 to read. Further alternatively, the user of the user device 1a may transmit the secret information such as a PIN code to the user of the client 3 orally, over phone, by an e-mail, or a mail, so that the secret information can be set to both the user device 1a and the client 3. As described so far, although there are various methods, the method to share this secret information is well known, thus the details thereof are omitted.

Since the operation of the communication control system according to the fourth exemplary embodiment of the present invention is almost the same as that of the communication control system 502 according to the third exemplary embodiment of the invention, only differences between them are explained hereinafter.

First, the user device 1a transmits this secret information to the proxy server 23 at the time of tunnel connection or after the tunnel is connected. Moreover, at the time of transmitting the communication request to the proxy server 23, the client 3 transmits this secret information.

After the step B6 in FIG. 8, the proxy server 23 verifies both secret information against each other, and when the secret information matches, the proxy server 23 skips the processes of the steps B7 to B9 considering that the access is allowed, and updates the access control list in the step B10.

In other words, the user device 1a transmits to the gateway 2a first verified information that is previously verified with the client 3, and the client 3 transmits to the gateway 2a second verified information that is previously verified with the user device 1a. Then, the gateway 2a updates the access control list DB 27 based on the first verified information received from the user device 1a and the second verified information received from the client 3.

Specifically, the gateway 2a receives from the user device 1a the first verified information that is previously verified with the client 3, receives from the client 3 the second verified information that is previously verified with the user device 1a, and updates the access control list DB 27 based on the received first verified information and the received second verified information.

An exemplary advantage of the fourth exemplary embodiment according to the present invention is explained in view of above. The exemplary advantage of the fourth exemplary embodiment according to the present invention is the point that the access control policy can be safely updated. This is because that the access control policy is updated only when the secret information shared between the user device and the client without using the network is verified by the gateway side. Accordingly, even when malicious third parties attempt to modify the access control policy, the attempt is not realized without the secret information, and therefore keeping the access control policy safe.

<Other Exemplary Embodiment>

The present invention relates to a method for connecting to an apparatus that is connected to a network via a gateway, an authentication method used therefor, a gateway, and a communication apparatus.

The communication system according to the other exemplary embodiment of the present invention is a system composed of a user device, a client, and a gateway, that are connected via a network. The user device is a device used by an end user and can be connected via the network. The user device is, typically, a personal computer, a mobile device including a mobile phone, a network connected home appliance, or a sensor device. However, it is not limited to this. The user device has a function as a server and can be accessed from an external communication device for information retrieval, or conversely, perform control. User devices that can be assumed are, typically, a Web server, an FTP server, and a DLNA server, however the user device may be the one using a unique protocol.

The user device may be directly connected to a wide area network such as the Internet, may be connected under a NAT router such as a home network, or may be connected to a closed network such as an intranet.

The user device has means to establish a tunnel with the gateway. The tunnel here can be a tunnel that encapsulates an IP packet to be transferred as in VPN, however it is not limited to this. For example, instead of encapsulating the IP packet, a method so-called port forwarding that forwards a TCP session may be used.

The client is an apparatus that accesses the user device to read information and also performs control. The client is typically a personal computer and operates the client using a Web browser. Alternatively, the client may be a service program operating on cloud instead of being operated by a person.

The gateway is a communication apparatus that receives a communication request from the client and transfers the communication request to the user device. The gateway includes a communication unit, a tunneling session establishment unit, a proxy server, a user authentication unit, a user database, an access control unit, an access control list database, and an access control list update unit. The gateway is generally disposed on a wide area network such as the Internet, but may be disposed on a closed network such as an intranet.

The tunneling session establishment unit receives the tunnel establishment request from the user device and establishes a tunnel. The proxy server is means to accept the communication request from the client by proxy and transmit the communication request to the user device via the tunnel.

Moreover, the user authentication unit authenticates the user device upon the tunnel establishment request from the user device. Conversely, the user authentication unit also authenticates the client upon communication request from the client. The user database is used for the authentication.

The access control unit receives authentication results of the above user device and client, evaluates whether the client is allowed to access the user device, and transfers the communication only when the access is evaluated as being allowed. The access control list database is used for evaluation of whether or not the access is allowed.

The access control list database records an entry that pairs the identifier of the access source client and an identifier of the user device that is allowed/denied to access by the client. Moreover, it is possible to describe in the access control list which client can access which resource of the user device. This enables control, for example, that allows read access to media (e.g. photos and movies) stored to the user device but does not allow access to personal information such as a name and a telephone number.

An exemplary advantage of the other exemplary embodiment according to the present invention is the point that the user device can receive the communication request from the client safely via the Internet and responds to the communication request. The reason for this is that the communication request is transferred using the tunnel established with the gateway apparatus, the gateway apparatus correctly authenticates the client, and transfers the communication after performing access control in accordance with the access control list. As the communication is transferred via the tunnel, it is possible to have configuration to deny all communication not using the tunnel.

Additionally, it is obvious that the present invention is not limited by the above exemplary embodiments but various modifications can be made thereto without departing from the scope of the already mentioned present invention. For example, the above exemplary embodiments explained the present invention as a hardware configuration, but the present invention is not limited to this. The present invention can also be realized by causing a CPU (Central Processing Unit) to execute arbitrary processes on a computer program. In this case, the program can be stored and provided to a computer using any type of non-transitory computer readable media.

Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the exemplary embodiments disclosed above can be described as, but not limited to, the following supplementary notes.

(Supplementary Note A1)

A communication system comprising:
 a first communication apparatus;
 a second communication apparatus; and
 a gateway, wherein the gateway comprises
  means for authenticating the first communication apparatus;
  means for establishing a virtual communication channel with the first communication apparatus;
  means for authenticating the second communication apparatus;
  means for receiving a communication request from the second communication apparatus;
  means for identifying the first communication apparatus corresponding to the communication request; and
  an access control means for evaluating whether to allow or deny access from the second communication apparatus to the first communication apparatus by verifying a result of authentication with access control policy, and
  when the gateway evaluates that the access is allowed, the gateway transfers the communication request to the first communication apparatus via the virtual communication channel established with the first communication apparatus.

(Supplementary Note A2)

The communication system according to Supplementary note A1, wherein the gateway adds identification information of the second communication apparatus upon transferring the access from the second communication apparatus to the first communication apparatus.

(Supplementary Note A3)

The communication system according to Supplementary note A1 or A2, wherein the access control means refers to information described in the communication request to be transferred to the first communication apparatus and performs access control.

(Supplementary Note A4)

The communication system according to any one of Supplementary notes A1 to A3, wherein in response to the access from the second communication apparatus to the gateway, the gateway notifies the first communication apparatus of the access, the first communication apparatus queries the user and notifies the gateway of a result of allowance or denial, and the gateway up dates the access control policy based on the result of allowance or denial.

(Supplementary Note A5)

The communication system according to any one of Supplementary notes A1 to A4, wherein the first communication apparatus transmits policy to be registered to the access control policy, and the gateway receives the policy and updates the access control policy.

(Supplementary Note A6)

The communication system according to any one of Supplementary notes A1 to A5, wherein the first communication apparatus and the second communication apparatus transmit verified information to the gateway, and the gateway updates the access control policy based on a result of verifying both information.

Further, the whole or part of the exemplary embodiments disclosed above can be described as, but not limited to, the following supplementary notes.

(Supplementary Note 1)

A communication control apparatus that controls communication via a network between a first communication apparatus for communicating via a virtual communication channel and a second communication apparatus for transmitting a communication request with the first communication apparatus, the communication control apparatus comprising:

a storage unit that stores access control policy, the access control policy defining allowance or denial of access to the first communication apparatus;

an establishment unit that establishes the virtual communication channel with the first communication apparatus via the network in response to a request from the first communication apparatus;

an authentication unit that authenticates the second communication apparatus based on the communication request received from the second communication apparatus via the network;

an access control unit that refers to the access control policy stored to the storage unit and evaluates whether to allow or deny access from the authenticated second communication apparatus to the first communication apparatus; and a transfer unit that transfers the received communication request to the first communication apparatus when the access control unit evaluates that the access is allowed.

(Supplementary Note 2)

The communication control apparatus according to Supplementary 1, wherein when the access control unit evaluates that the access is allowed, the transfer unit adds identification information of the second communication apparatus to the received communication request and transfers the communication request to the first communication apparatus, the transfer means receives from the first communication apparatus a response based on the identification information added to the transferred communication request and transfers the response to the second communication apparatus via the network.

(Supplementary Note 3)

The communication control apparatus according to Supplementary note 1 or 2, wherein the access control unit evaluates whether to allow or deny the access using information included in the communication request received from the second communication apparatus.

(Supplementary Note 4)

The communication control apparatus according to any one of Supplementary notes 1 to 3, further comprising an access control policy update unit that, in response to receipt of an update content of the access control policy in the second communication apparatus from the first communication apparatus, updates the access control policy stored to the storage unit with the received update content.

(Supplementary Note 5)

The communication control apparatus according to Supplementary note 4, wherein the transfer unit transmits to the first communication apparatus an evaluation request for whether to allow or deny the access from the second communication apparatus when the access control means evaluates that the access is denied, the transfer unit receives an evaluation result for the evaluation request from the first communication request, the transfer unit responds to the second communication apparatus according to the received evaluation result for the evaluation request, and the access control policy update unit updates the access control policy according to the received evaluation result.

(Supplementary Note 6)

The communication control apparatus according to Supplementary note 4 or 5, wherein the access control policy update unit updates the access control policy with policy to be registered to the access control policy that is added to the response from the first communication apparatus.

(Supplementary Note 7)

The communication control apparatus according to any one of Supplementary notes 1 to 6, wherein the communication control apparatus receives from the first communication apparatus first verified information that is already verified with the second communication apparatus, receives from the second communication apparatus second verified information that is already verified with the first communication apparatus, and updates the access control policy based on the received first verified information and the received second verified information.

(Supplementary Note 8)

The communication control apparatus according to Supplementary note 5, wherein the access control policy update unit updates the access control policy when the received evaluation result includes access allowance for a communication request other than for the received communication request.

(Supplementary Note 9)

A communication control system comprising a first communication apparatus, a second communication apparatus, and a communication control apparatus, the first communication apparatus communicating via a virtual communication channel, the second communication apparatus transmitting a communication request to the first communication apparatus, and the communication control apparatus controlling communication via a network between the first communication apparatus and the second communication apparatus, wherein the communication control apparatus comprises:

storage means for storing access control policy, the access control policy defining whether to allow or deny access to the first communication apparatus;

establishment means for establishing the virtual communication channel with the first communication apparatus via the network in response to a request from the first communication apparatus;

authentication means for authenticating the second communication apparatus based on the communication request received from the second communication apparatus via the network;

access control means for referring to the access control policy stored to the storage means and evaluating whether to allow or deny access from the authenticated second communication apparatus to the first communication apparatus; and transfer means for transferring the received communication request to the first communication apparatus when the access control means evaluates that the access is allowed.

(Supplementary Note 10)

The communication control system according to Supplementary note 9, wherein when the access control means evaluates that the access is allowed, the transfer means adds identification information of the second communication apparatus to the received communication request and transfers the communication request to the first communication apparatus, and the first communication apparatus responds based on the identification information added to the transferred communication request.

(Supplementary Note 11)

The communication control apparatus according to Supplementary note 9 or 10, wherein the access control means evaluates whether to allow or deny the access using information included in the communication request received from the second communication apparatus.

(Supplementary Note 12)

The communication control system according to any one of Supplementary notes 9 to 11, wherein the communication control apparatus further comprises access control policy update means for updating the access control policy stored to the storage means, the first communication apparatus transmits an update content of the access control policy in the second communication apparatus to the communication control apparatus, and the access control policy update means updates the access control policy with the update content received from the first communication apparatus.

(Supplementary Note 13)

The communication control system according to Supplementary note 12, wherein the transfer means transmits to the first communication apparatus an evaluation request for whether to allow or deny the access from the second communication apparatus when the access control means evaluates that the access is denied, the first communication apparatus transmits an evaluation result for the evaluation request to the communication control apparatus, the access control policy update means updates the access control policy according to the received evaluation result, and the communication control apparatus responds to the second communication apparatus according to the received evaluation result.

(Supplementary Note 14)

The communication control system according to Supplementary note 12 or 13, wherein the first communication apparatus adds policy to be registered to the access control policy and responds to the transferred communication request, and the access control policy update means updates the access control policy with the policy added to the response from the first communication apparatus.

(Supplementary Note 15)

The communication control system according to any one of Supplementary notes 9 to 14, wherein the first communication apparatus transmits to the communication control apparatus first verified information that is already verified with the second communication apparatus, the second communication apparatus transmits to the communication control apparatus second verified information that is already verified with the first communication apparatus, and the communication control apparatus updates the access control policy based on the first verified information received from the first communication apparatus and the second verified information received from the second communication apparatus.

(Supplementary Note 16)

The communication control system according to Supplementary note 13, wherein the first communication apparatus outputs the evaluation request to outside, receives an evaluation result for the evaluation request from the outside, and transmits the received evaluation result to the communication control apparatus.

(Supplementary Note 17)

The communication control system according to Supplementary note 13 or 16, wherein the access control policy update means updates the access control policy when the received evaluation result includes access allowance for a communication request other than for the received communication request.

(Supplementary Note 18)

The communication control system according to any one of Supplementary notes 9 to 17, wherein the first communication apparatus provides a predetermined service via the virtual communication channel, and the second communication apparatus transmits a service request for receiving the predetermined service as the communication request.

(Supplementary Note 19)

A communication control method for controlling communication between a first communication apparatus and a second communication apparatus via a network, the communication control method comprising:

in response to a request from the first communication apparatus for communicating via a virtual communication channel, establishing the virtual communication channel with the first communication apparatus via the network;

authenticating the second communication apparatus based on the communication request with the first communication apparatus received from the second communication apparatus via the network;

referring to access control policy and evaluating whether to allow or deny access from the authenticated second communication apparatus to the first communication apparatus, the access control policy defining whether to allow or deny access to the first communication apparatus; and transferring the received communication request to the first communication apparatus when the access is evaluated as being allowed.

(Supplementary Note 20)

The communication control method according to Supplementary note 19, wherein when the access is evaluated as being allowed, identification information of the second communication apparatus is added to the received communication request, and the communication request is transferred to the first communication apparatus;

a response based on the identification information added to the transferred communication request is received from the first communication apparatus; and the response is transferred to the second communication apparatus via the network.

(Supplementary note 21)

The communication control method according to Supplementary note 19 or 20, wherein the information included in the communication request received from the second communication apparatus is used to evaluate whether to allow or deny the access.

(Supplementary Note 22)

The communication control method according to any one of Supplementary notes 19 to 21, wherein in response to receipt of an update content of the access control policy in the second communication apparatus from the first communication apparatus, the access control policy is updated with the received update content.

(Supplementary Note 23)

The communication control method according to Supplementary note 22, wherein when the access is evaluated as being denied, an evaluation request for whether to allow or deny access from the second communication apparatus to the first communication apparatus is transmitted to the first communication apparatus, an evaluation result for the evaluation request is received from the first communication apparatus, the access control policy is updated according to the received evaluation result, and a response is made to the second communication apparatus according to the received evaluation result.

(Supplementary Note 24)

The communication control method according to Supplementary note 22 or 23, wherein the response to the transferred communication request added with policy to be registered to the access control policy is received from the first communication apparatus, and the access control policy is updated with the policy added to the received response.

(Supplementary Note 25)

The communication control method according to any one of Supplementary notes 19 to 24, wherein first verified information that is already verified with the second communication apparatus is received from the first communication apparatus, second verified information that is already verified with the first communication apparatus is received from the second communication apparatus, and the access control policy is updated based on the received first verified information and the received second verified information.

(Supplementary Note 26)

The communication control method according to Supplementary note 23, wherein the first communication apparatus receives the evaluation request, outputs the received evaluation request to outside, receives an evaluation result for the evaluation request from the outside, and returns the received evaluation result.

(Supplementary Note 27)

The communication control method according to Supplementary note 23 or 26, wherein the access control policy is updated when the received evaluation result includes access allowance for a communication request other than for the received communication request.

(Supplementary Note 28)

A communication control program causing a computer to execute a process comprising:

an establishment process that, in response to a request from a first communication apparatus for communicating via a virtual communication channel, establishes the virtual communication channel with the first communication apparatus via the network;

an authentication process that authenticates the second communication apparatus based on the communication request received from the second communication apparatus via the network;

an access control process that refers to access control policy and evaluates whether to allow or deny access from the authenticated second communication apparatus to the first communication apparatus, the access control policy being stored to a storage unit and defining whether to allow or deny access to the first communication apparatus; and a transfer process that transfers the received communication request to the first communication apparatus when the access control process evaluates that the access is allowed.

(Supplementary Note 29)

The communication control program according to Supplementary 28, wherein when the access control process evaluates that the access is allowed, the transfer process adds identification information of the second communication apparatus to the received communication request and transfers the communication request to the first communication apparatus, and the transfer process receives from the first communication apparatus a response based on the identification information added to the transferred communication request and transfers the response to the second communication apparatus via the network.

(Supplementary Note 30)

The communication control apparatus according to Supplementary note 28 or 29, wherein the access control process evaluates whether to allow or deny the access using information included in the communication request received from the second communication apparatus.

(Supplementary Note 31)

The communication control apparatus according to any one of Supplementary notes 28 to 30, further comprising an access control policy update process that, in response to receipt of an update content of the access control policy in the second communication apparatus from the first communication apparatus, updates the access control policy stored to the storage unit with the received update content.

(Supplementary Note 32)

The communication control program according to Supplementary note 31, wherein the transfer process transmits to the first communication apparatus an evaluation request for whether to allow or deny the access from the second communication apparatus when the access control process evaluates that the access is denied, the transfer process receives an evaluation result for the evaluation request from the first communication request, the transfer process responds to the second communication apparatus according to the received evaluation result for the evaluation request, and the access control policy update process updates the access control policy according to the received evaluation result.

(Supplementary Note 33)

The communication control apparatus according to Supplementary note 31 or 32, wherein the access control policy update process updates the access control policy with policy to be registered to the access control policy that is added to the response from the first communication apparatus.

(Supplementary Note 34)

The communication control program according to any one of Supplementary notes 28 to 33, wherein the access control policy update process receives from the first communication apparatus first verified information that is already verified with the second communication apparatus, receives from the second communication apparatus second verified information that is already verified with the first communication apparatus, and updates the access control policy based on the received first verified information and the received second verified information.

(Supplementary Note 35)

The communication control apparatus according to Supplementary note 32, wherein the access control policy update process updates the access control policy when the received evaluation result includes access allowance for a communication request other than for the received communication request.

Although the present invention has been explained with reference to the exemplary embodiments, the present invention in not limited by above. Various modifications that can be understood by a person skilled in the art can be made to the configurations and details of the present invention within the scope of the invention.

The present application claims priority rights of and is based on Japanese Patent Application No. 2010-235283 filed on Oct. 20, 2010 in the Japanese Patent Office, the entire contents of which are hereby incorporated by reference.

REFERENCE SIGNS LIST

100 COMMUNICATION CONTROL APPARATUS
110 STORAGE UNIT
111 ACCESS CONTROL POLICY
120 ESTABLISHMENT UNIT
130 AUTHENTICATION UNIT
140 ACCESS CONTROL UNIT
150 TRANSFER UNIT
200 FIRST COMMUNICATION APPARATUS
300 SECOND COMMUNICATION APPARATUS
400 NETWORK
1 USER DEVICE
1a USER DEVICE
11 COMMUNICATION UNIT
12 TUNNEL ESTABLISHMENT UNIT
13 SERVER
14 USER CHECK UNIT
2 GATEWAY
2a GATEWAY
21 COMMUNICATION UNIT
22 TUNNEL ESTABLISHMENT UNIT
23 PROXY SERVER
24 USER AUTHENTICATION UNIT
25 USER DB
26 ACCESS CONTROL UNIT
27 ACCESS CONTROL LIST DB
28 ACCESS CONTROL LIST UPDATE UNIT
210 CPU
220 RAM
230 ROM
240 IF UNIT
250 HARD DISK
251 OS
252 COMMUNICATION CONTROL PROGRAM
253 USER DB
254 ACCESS CONTROL LIST DB
3 CLIENT
4 NETWORK
500 COMMUNICATION CONTROL SYSTEM
501 COMMUNICATION CONTROL SYSTEM
502 COMMUNICATION CONTROL SYSTEM

The invention claimed is:

1. A communication control apparatus being communicatively coupled with first and second communication apparatuses via a network, the communication control apparatus comprising:

a memory device that stores a set of instructions and an access control policy defining allowance or denial of access to the first communication apparatus; and at least one processor capable of executing the set of instructions to:

establish a virtual communication channel with the first communication apparatus via the network in response to an establishment request received from the first communication apparatus;

receive a communication request from the second communication apparatus via the network, wherein the communication request is not received via a virtual communication channel;

authenticate the second communication apparatus based on the communication request;

acquire the access control policy from the memory device;

determine whether to allow or deny access from the authenticated second communication apparatus to the first communication apparatus based on the access control policy; and responsive to determining to allow access from the authenticated second communication apparatus to the first communication apparatus, transmit the communication request to the first communication apparatus via the virtual communication channel;

if access is denied based on the access control policy, query the first communication apparatus via the virtual communication channel whether to allow or deny access from the authenticated second communication apparatus to the first communication apparatus;

acquire, from the first communication apparatus, first information for updating the access control policy after querying the first communication apparatus; and update the access control policy based on the first information;

wherein the first and second communication apparatuses are separate apparatuses.

2. The communication control apparatus according to claim 1, wherein the at least one processor is further capable of executing the set of instructions to:

responsive to determining to allow access from the authenticated second communication apparatus to the first communication apparatus, transmit, with the communication request, identification information associated with the second communication apparatus to the first communication apparatus via the virtual communication channel, wherein the transmission of the identification information allows the first communication apparatus to generate a response based on the identification information;

receive, from the first communication apparatus, a response to the communication request; and transmit the response to the second communication apparatus.

3. The communication control apparatus according to claim 2, wherein the response includes second information for updating the access control policy, and wherein the at least one processor is further capable of executing the set of instructions to update the access control policy based on the second information.

4. The communication control apparatus according to claim 1, wherein the determination of whether to allow or deny the access is based on information included in the communication request via the network.

5. The communication control apparatus according to claim 1, wherein the at least one processor is further capable of executing the set of instructions to:

receive from the first communication apparatus third information that is already verified with the second communication apparatus, receive from the second communication apparatus fourth information that is already verified with the first communication apparatus, and update the access control policy based on the third and fourth information.

6. The communication control apparatus of claim 1, wherein the communication request includes a request for data content directed to the first communication device.

7. The communication control apparatus of claim 6, wherein the communication request includes a Hypertext Transfer Protocol request.

8. A communication control system comprising a first communication apparatus, a second communication apparatus, and a communication control apparatus, the communication control apparatus being communicatively coupled with the first and second communication apparatuses via a network, wherein the communication control apparatus comprises:

a memory device that stores a set of instructions and an access control policy defining allowance or denial of access to the first communication apparatus; and at least one processor capable of executing the set of instructions to:

establish a virtual communication channel with the first communication apparatus via the network in response to an establishment request received from the first communication apparatus;

receive a communication request from the second communication apparatus via the network, wherein the communication request is not received via a virtual communication channel;

authenticate the second communication apparatus based on the communication request;

acquire the access control policy from the memory device;

determine whether to allow or deny access from the authenticated second communication apparatus to the first communication apparatus based on the access control policy;

responsive to determining to allow access from the authenticated second communication apparatus to the first communication apparatus, transmit the communication request to the first communication apparatus via the virtual communication channel;

if access is denied based on the access control policy, query the first communication apparatus via the virtual communication channel whether to allow or deny access from the authenticated second communication apparatus to the first communication apparatus;

acquire, from the first communication apparatus, first information for updating the access control policy after querying the first communication apparatus; and update the access control policy based on the first information;

wherein the first and second communication apparatuses are separate apparatuses.

9. The communication control system of claim 8, wherein the communication request includes a request for data content directed to the first communication device.

10. The communication control system of claim 9, wherein the communication request includes a Hypertext Transfer Protocol request.

11. A communication control method for controlling communication between a first communication apparatus and a second communication apparatus via a network, the communication control method comprising:

establishing a virtual communication channel with the first communication apparatus via the network in response to an establishment request received from the first communication apparatus;

receiving a communication request from the second communication apparatus via the network, wherein the communication request is not received via a virtual communication channel;

authenticating the second communication apparatus based on the communication request;

determining whether to allow or deny access from the authenticated second communication apparatus to the first communication apparatus based on access control policy defining whether to allow or deny access to the first communication apparatus;

responsive to determining to allow access from the authenticated second communication apparatus to the first communication apparatus, transmitting the communication request to the first communication apparatus via the virtual communication channel;

if access is denied based on the access control policy, querying the first communication apparatus via the virtual communication channel whether to allow or deny access from the authenticated second communication apparatus to the first communication apparatus;

acquiring, from the first communication apparatus, first information for updating the access control policy after querying the first communication apparatus; and updating the access control policy based on the first information;

wherein the first and the second communication apparatuses are separate apparatuses.

12. The communication control method of claim 11, wherein the communication request includes a request for data content directed to the first communication device.

13. The communication control method of claim 12, wherein the communication request includes a Hypertext Transfer Protocol request.

14. A non-transitory computer readable medium storing a communication control program thereon, the communication control program causing a computer to execute a method for controlling communication between a first communication apparatus and a second communication apparatus via a network, the method comprising:

establishing a virtual communication channel with the first communication apparatus via the network in response to an establishment request received from the first communication apparatus;

receiving a communication request from the second communication apparatus via the network, wherein the communication request is not received via a virtual communication channel;

authenticating the second communication apparatus based on the communication request;

determining whether to allow or deny access from the authenticated second communication apparatus to the first communication apparatus based on access control policy defining whether to allow or deny access to the first communication apparatus;

responsive to determining to allow access from the authenticated second communication apparatus to the first communication apparatus, transmitting the communication request to the first communication apparatus via the virtual communication channel;

if access is denied based on the access control policy, querying the first communication apparatus via the virtual communication channel whether to allow or deny access from the authenticated second communication apparatus to the first communication apparatus;

acquiring, from the first communication apparatus, first information for updating the access control policy after querying the first communication apparatus; and updating the access control policy based on the first information;

wherein the first and the second communication apparatuses are separate apparatuses.

15. The non-transitory computer readable medium of claim 14, wherein the communication request includes a request for data content directed to the first communication device.

16. The non-transitory computer readable medium of claim 15, wherein the communication request includes a Hypertext Transfer Protocol request.

\* \* \* \* \*